United States Patent [19]

Slape

[11] Patent Number: 5,722,755
[45] Date of Patent: Mar. 3, 1998

[54] ILLUMINATION DEVICE, PARTICULARLY USEABLE AS A PROJECTOR FOR COLOR PHOTOGRAPHY

[76] Inventor: Dennis R. Slape, 6209 N. Imperial Dr., Peoria, Ill. 61614

[21] Appl. No.: 503,607

[22] Filed: Jul. 18, 1995

[51] Int. Cl.$^6$ .................................................. G03B 15/02
[52] U.S. Cl. .................... 362/11; 362/9; 362/231; 362/240; 362/251; 362/293; 362/295
[58] Field of Search .................... 396/231, 182, 396/164, 155; 362/8, 9, 11–13, 227, 230, 231, 234–237, 240, 251, 293, 295

[56] References Cited

U.S. PATENT DOCUMENTS

| | | | |
|---|---|---|---|
| 3,143,300 | 8/1964 | Way | 362/231 |
| 3,789,211 | 1/1974 | Kramer | 362/231 |
| 3,805,049 | 4/1974 | Frank et al. | 362/231 |
| 4,194,234 | 3/1980 | Geissler | 362/17 |
| 4,323,952 | 4/1982 | Proske | 362/17 |
| 4,326,150 | 4/1982 | Kobayashi | 362/231 |
| 4,409,646 | 10/1983 | Baliozian | 362/319 |
| 4,677,533 | 6/1987 | McDermott et al. | 362/240 |
| 4,963,798 | 10/1990 | McDermott | 362/231 |
| 5,055,976 | 10/1991 | Arai | 362/17 |
| 5,195,814 | 3/1993 | Hasushita et al. | 362/18 |
| 5,452,188 | 9/1995 | Green et al. | 362/231 |
| 5,597,231 | 1/1997 | Rosset | 362/231 |

FOREIGN PATENT DOCUMENTS

| | | | |
|---|---|---|---|
| 668268 | 8/1963 | Canada | 362/17 |

*Primary Examiner*—Alan Cariaso
*Attorney, Agent, or Firm*—Mark E. Wiemelt

[57] ABSTRACT

This invention provides an improved illumination device (10) which provides light fluxes with continuously variable spectral content and luminosity. The illumination device (10) includes a power supply (20) which is contained in a housing (24) which has a front face (28). Light sources (30a, 30b & 30c) are mounted on the front face (28) of the housing (24) and are connected to the power supply (20). The light sources (30a, 30b & 30c) are disposed to emit light fluxes substantially in the direction (38) of a selected object in front of the illumination device (10). The illumination device (10) also includes a color screen (40a, 40b and 40c) associated with each light source (30a, 30b and 30c). The colored screens (40a, 40b and 40c) are mounted intermediate the light sources (30a, 30b and 30c) and the selected object in front of the illumination device (10) and disposed so that light fluxes emitted from the light sources (30a, 30b and 30c) are transmitted through the colored screens (40a, 40b and 40c) and toward the selected object. The illumination device (10) also includes continuously variable potentiometers connected to the power supply (20) and light sources (30a, 30b and 30c) for independently and selectively varying the light fluxes emitted from each of the light sources (30a, 30b and 30c), so that the luminosity and color saturation of the light fluxes projected toward the object can be varied.

14 Claims, 4 Drawing Sheets

5,722,755

ILLUMINATION DEVICE, PARTICULARLY USEABLE AS A PROJECTOR FOR COLOR PHOTOGRAPHY

BACKGROUND OF THE INVENTION

The present invention relates generally to a new and improved illumination device, and in particular to an illumination device, particularly useable as a projector for color photography, which provides strobe light fluxes and modelling light fluxes having continuously variable luminosity and color saturation.

Numerous devices have heretofore been proposed for providing light fluxes with varying spectral content and luminosity, and these have included Canadian Patent No. 668,268, issued to Clapp on Aug. 6, 1963, and U.S. Pat. No. 4,409,646, issued to Baliozian on Oct. 11, 1983. However, each of the prior art devices have been found wanting in one or more particulars. Specifically, the user of the prior art devices must always have on hand a number of different screens, filters, gels, or the like, and must insert or attach the different screens, filters, gels, or the like, each time the color saturation is to be varied, such deficiency resulting in a cumbersome, difficult, laborius and time-consuming process. In addition, the user of the prior art devices is not able to continuously, rapidly, easily and efficiently vary the color saturation. Furthermore, none of the prior art devices allows the user to effectively pre-visualize the strobe light fluxes to be projected toward the object prior to the strobe device being discharged by providing modelling light sources having continuously variable luminosity and color saturation.

The invention of this application represents a recent innovation in the art which overcomes the deficiencies of the prior art.

SUMMARY OF THE INVENTION

It is an object of the present invention to provide an improved illumination device particularly usable for color photography.

More specifically, it is an object of the present invention to provide an improved illumination device which provides strobe light fluxes having continuously variable luminosity and color saturation It is another object of the present invention to provide an improved illumination device in accordance with the foregoing objects which provides strobe light fluxes having instantaneously variable luminosity and color saturation.

It is yet another object of the present invention to provide an improved illumination device in accordance with the foregoing objects which includes modelling light fluxes having continuously variable luminosity and color saturation.

It is still another object of the present invention to provide an improved illumination device in accordance with the foregoing objects which includes modelling light fluxes having instantaneously variable luminosity and color saturation.

It is another object of the present invention to provide an improved illumination device in accordance with the foregoing objects which includes strobe light sources and associated modelling light sources whose luminosity and color saturation are dependently linked so that the luminosity and color saturation of the modelling light fluxes projected toward an object can be used to previsualize the luminosity and color saturation of the strobe light fluxes which will be projected toward the object.

It is a further object of the present invention to provide an illumination device in accordance with the foregoing objects which is simple in design, inexpensive to manufacture, portable and lightweight.

It is therefore an object of the present invention to provide a new and improved illumination device which has all the advantages of the prior art and none of its disadvantages.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

A broad aspect of the invention involves an improved illumination device which provides light fluxes with continuously variable spectral content and luminosity. The device includes a power supply which is contained in a housing which has a front face. Light sources are mounted on the front face of the housing and are connected to the power supply. The light sources are disposed to emit light fluxes substantially in the direction of a selected object in front of the illumination device. The device also includes a color screen associated with each light source. The colored screens transmit certain selected portions of the light spectrum and are mounted intermediate the light sources and the selected object in front of the illumination device and disposed so that light fluxes emitted from the light sources are transmitted through the colored screens and toward the selected object. The device also includes means connected to the power supply and light sources for independently and selectively varying the light fluxes emitted from each of the light sources, so that the luminosity and color saturation of the light fluxes projected toward the object can be varied.

A somewhat more limited aspect of the invention involves the aforementioned device having at least three light sources and at least three colored screens. The colored screens each transmit only one of the primary light colors; namely, red, blue, and green, inclusive.

Another limited aspect of the present invention involves the use of strobe light sources.

Still another aspect of the present invention involves a modelling light source associated with each strobe light source and mounted on the front face of the housing proximate the respective strobe light sources. The modelling light sources are connected to the power supply and emit modelling light fluxes through the colored screens and toward the selected object in front of the device. The modelling light sources are also connected to means which independently and selectively vary the luminosity and color saturation of the modelling light fluxes. The means connected to the strobe light sources for independently and selectively varying the strobe light fluxes and the means connected to the associated modelling light sources for independently and selectively varying the modelling light fluxes may be calibrated so that corresponding settings produce strobe light fluxes and associated modelling light fluxes of substantially equal luminosity and color saturation.

Yet another object of the present invention involves means for selectively varying the strobe light fluxes and associated modeling light fluxes by dependently linking each strobe light source and associated modelling light source to produce strobe light fluxes and associated modelling light fluxes of substantially equal luminosity and color saturation which van be varied in dependent fashion so that the luminosity and color saturation of the modelling light projected toward an object can be used to pre-visualize the luminosity and color saturation of the strobe light fluxes which will be projected toward the object.

A further aspect of the present invention involves an illumination device including a power supply which is contained in a housing which has a front face. Colored light sources which emit colored light are mounted on the front face of the housing and are connected to the power supply. The colored light sources are disposed to emit colored light fluxes substantially in the direction of a selected object in front of the illumination device. The device also includes means connected to the power supply and colored light sources for independently and selectively varying the output of each of the colored light sources, so that the luminosity and color saturation of the colored light fluxes projected toward the object can be varied.

A somewhat more limited aspect of the invention involves the aforementioned device wherein the colored light sources include three light bulbs or lamps, each light bulb or lamp transmitting only one of the primary light colors; namely, red, blue, and green, inclusive. The light sources may be strobe light sources.

Still another aspect of the present invention involves colored modelling light sources which emit colored light fluxes, each of the colored modelling light sources being associated with a colored strobe light source and mounted on the front face of the housing proximate the respective colored strobe light sources. The colored modelling light sources are connected to the power supply and emit colored modelling light fluxes toward the selected object in front of the device. The colored modelling light sources are also connected to means which independently and selectively vary the luminosity and color saturation of the colored modelling light fluxes. The means connected to the colored strobe light sources for independently and selectively varying the colored strobe light fluxes and the means connected to the associated colored modelling light sources for independently and selectively varying the modelling light fluxes may be calibrated so that corresponding settings produce colored strobe light fluxes and associated colored modelling light fluxes of substantially equal luminosity and color saturation.

Yet another object of the present invention involves means for selectively varying the colored strobe light fluxes and associated colored modelling light fluxes by dependently linking each colored strobe light source and associated colored modelling light source to produce colored strobe light fluxes and associated colored modelling light fluxes of substantially equal luminosity and color saturation which van be varied in dependent fashion, so that the luminosity and color saturation of the colored modelling light fluxes projected toward an object can be used to pre-visualize the luminosity and color saturation of the colored strobe light fluxes which will be projected toward the object.

There has thus been outlined, rather broadly, the more important features of the invention in order that the detailed description thereof that follows may be better understood, and in order that the present contribution to the art may be better appreciated. There are, of course, additional features of the invention that will be described hereinafter and that will form the subject matter of the claims appended hereto. Those skilled in the art will appreciate that the conception, upon which this disclosure is based, may readily be utilized as a basis for the designing of other devices for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Corresponding reference numerals indicate corresponding parts throughout the several views of the drawings.

DETAILED DESCRIPTION OF THE PREFERRED EMBODIMENT

Figure 1:
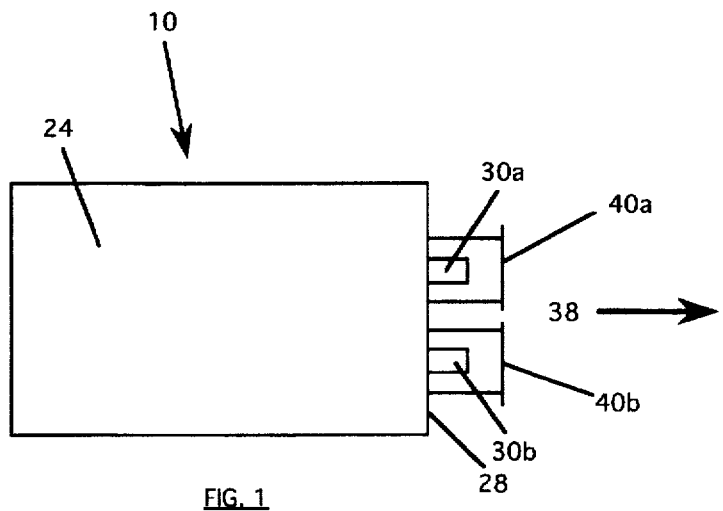
FIG. 1 is a side view of an illumination device constructed according to the principles of the present invention illustrating strobe light sources mounted on the front face of a housing, colored screens, and the direction of a selected object in front of the device.
Figure 2:
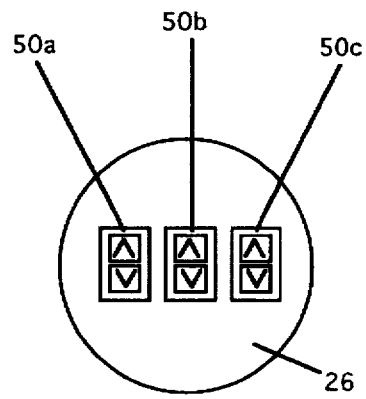
FIG. 2 is a rear view of the illumination device constructed according to the principles of the present invention illustrating means mounted on the back face of the housing for varying the illumination and color saturation of strobe light fluxes.
Figure 3:
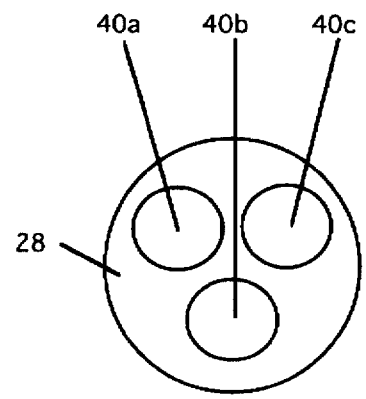
FIG. 3 is a front view of the illumination device constructed according to the principles of the present invention illustrating the colored screens.
Figure 4:
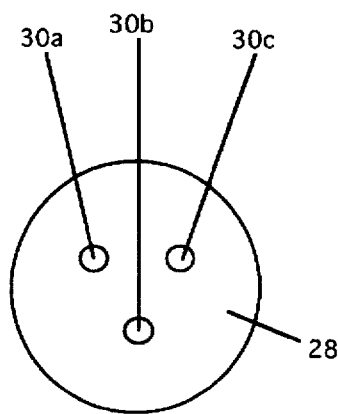
FIG. 4 is a front view of the illumination device constructed according to the principles of the present invention illustrating strobe light sources mounted on the front face of the housing.
Figure 5:
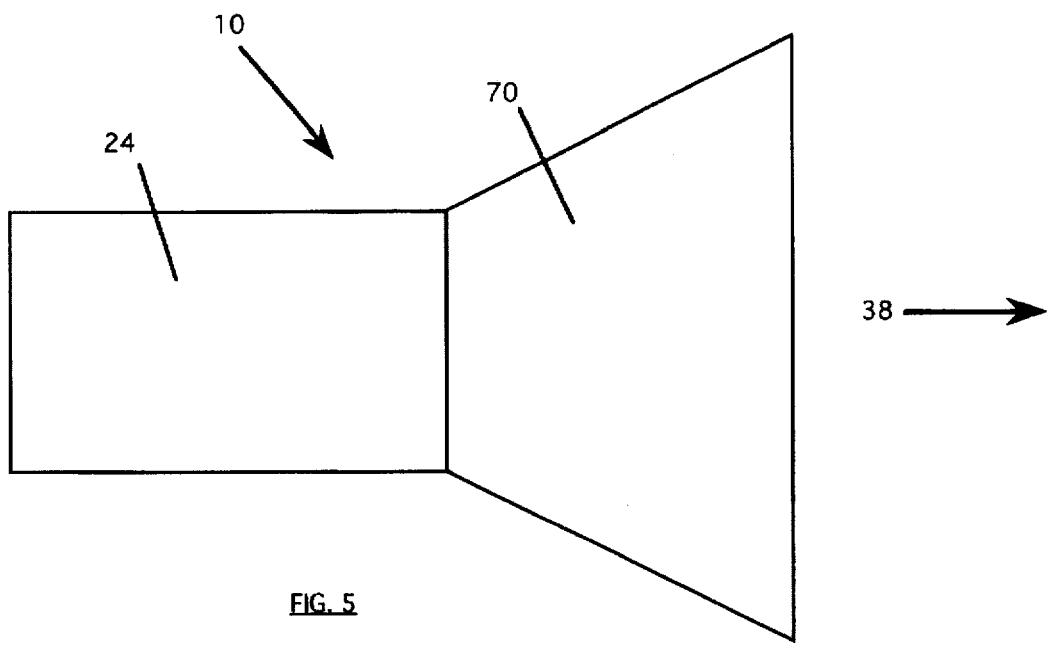
FIG. 5 is a side view of an alternative illumination device constructed according to the principles of the present invention illustrating a housing, a reflector, and the direction of a selected object in front of the device.
Figure 8:
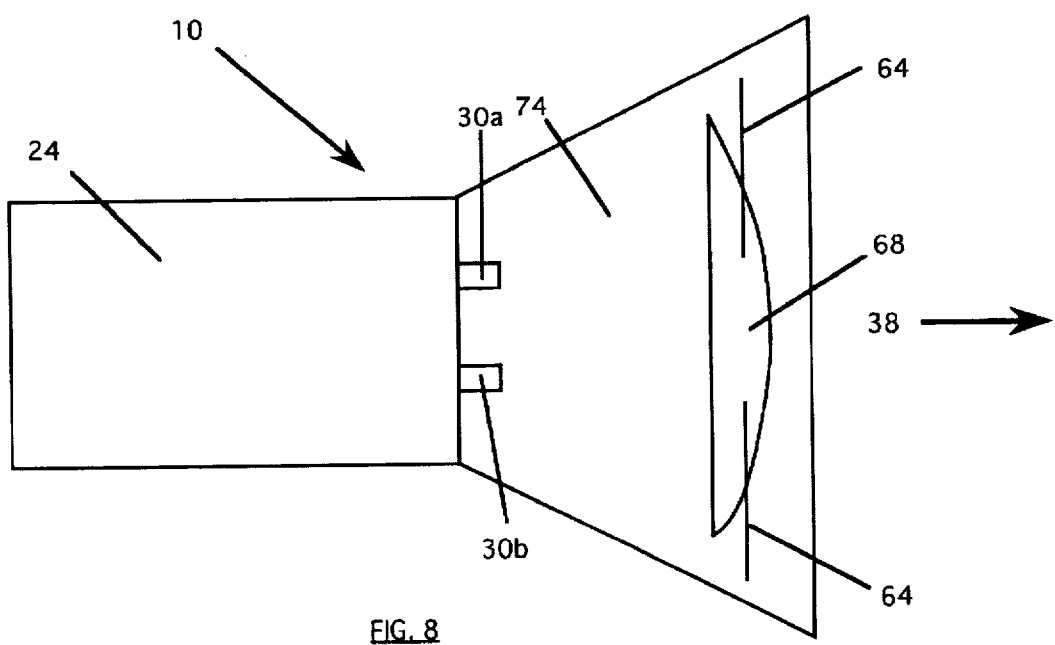
FIG. 8 is a cross-sectional view taken along line 8—8 of FIG. 7 illustrating strobe light sources mounted on the front face of the housing, the interior reflecting reflector surface, the interior reflecting mixer surface, the attachment means which fix the mixer within the reflector, and the direction of a selected object in front of the device.

Referring now to the drawings in detail there is illustrated an illumination device constructed in accordance with the principles of the present invention and designated generally in its entirety by the reference numeral 10 in FIGS. 1, 5 & 8.

To illustrate the invention, FIGS. 1, 2, 3 & 4 show a preferred embodiment illustrating the illumination device 10 including a conventional power supply 20 (not shown) which includes the usual electronic circuitry, battery unit, if used, capacitor and discharge control circuitry, and the like, used to power conventional photographic lighting devices. The power supply 20 is contained in a housing 24 having a front face 28 and a back face 26. The housing 24 is preferably cylindrical in shape and is constructed of injection molded plastic, although it will readily be understood by those skilled in the art that the housing 24 may be of varying sizes, shapes, forms, materials or construction.

In the preferred embodiment, light sources 30a, 30b & 30c, which are of conventional design and which are available from a variety of commercial sources, are mounted on the front face 28 of the housing 24. The light sources 30a, 30b & 30c are connected to the power supply 20 and disposed to emit light fluxes substantially in the direction 38 of a selected object in front of the illumination device 10.

The illumination device 10 of the preferred embodiment also includes a colored screen 40a, 40b & 40c associated with each of the light sources 30a, 30b & 30c and mounted intermediate the light sources 30a, 30b & 30c and the selected object in front of the illumination device 10. To clarify, colored screen 40a is associated with light source 30a and is mounted intermediate light source 30a and the selected object, colored screen 40b is associated with light source 30b and is mounted intermediate light source 30b and the selected object, and colored screen 40c is associated with light source 30c and is mounted intermediate light source 30c and the selected object. The colored screens 40a, 40b & 40c transmit certain selected portions of the light spectrum. The colored screens 40a, 40b & 40c may be disposed to receive and transmit therethrough all of the light emitted from the light sources 30a, 30b & 30c. The colored screens 40a, 40b & 40c may be formed and disposed to fully enclose the outer ends of the light sources 30a, 30b & 30c. It should be readily understood that colored gels may be used in place of the colored screens 40a, 40b & 40c. The gels are colored translusent sheets of plastic which are well-known in the art and available from a variety of commercial sources.

The illumination device 10 of the preferred embodiment further includes means 50a, 50b & 50c for independently and selectively varying the light fluxes emitted from the light sources 30a, 30b & 30c, so that the luminosity and color saturation of the light fluxes projected through the colored screens 40a, 40b and 40c and toward the object can be varied. The means 50a, 50b & 50c generally comprise adjustable potentiometers with continuously variable output. The means 50a, 50b & 50c are connected to the power supply 20 by leads 52a, 52b & 52c (not shown) and connected to the light sources 30a, 30b & 30c by leads 54a, 54b & 54c (not shown).

In the preferred embodiment, the light sources 30a, 30b & 30c are strobe lights commercially available from several sources and the colored screens 40a, 40b & 40c each transmit only one of the three primary light colors; namely, red, blue, and green, inclusive. To exemplify, colored screen 40a transmits only red light, colored screen 40b transmits only blue light, and colored screen 40c transmits only green light.

In operation of the preferred embodiment, the illumination device 10 is disposed and the light sources 30a, 30b & 30c activated so that light fluxes are transmitted through the colored screens 40a, 40b and 40c generally in the direction 38 of the selected object. The means 50a, 50b & 50c are independently and selectively adjusted to project light fluxes having the desired luminosity and color saturation at the object.

Figure 6:
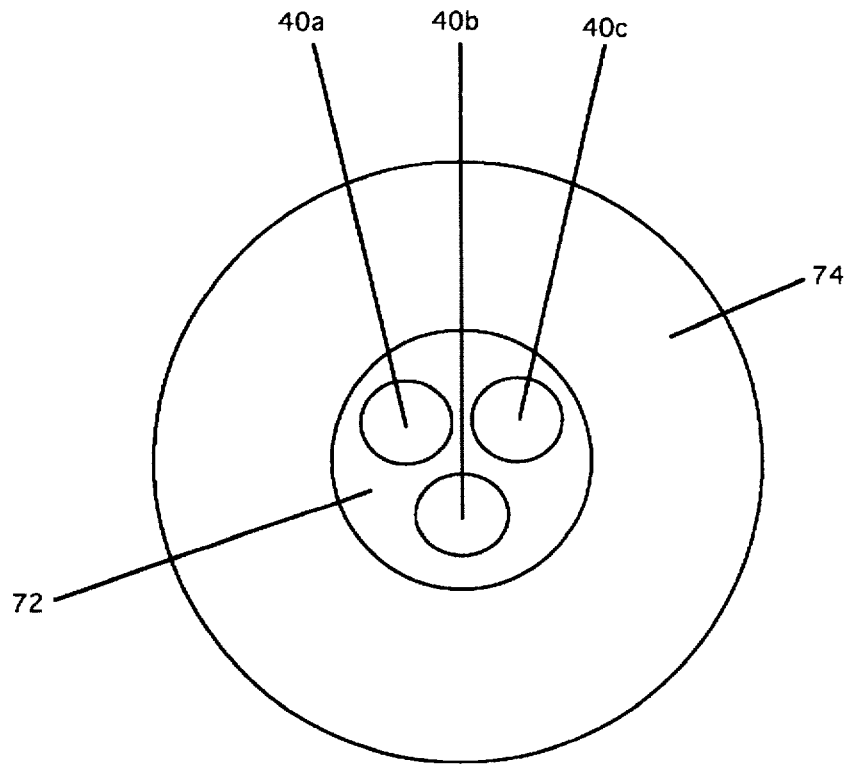
FIG. 6 is a front view of an alternative illumination device constructed according to the principles of the present invention illustrating the interior reflecting reflector surface, colored screens, and the front face of the housing.

In an alternative embodiment shown in FIGS. 5 & 6 there is illustrated a reflector 70 which is attached to the front face 28 of the housing 24. The reflector 70 comprises a truncated cone terminating in an integrally formed, generally round, planar surface 72. The reflector 70 has a central axis and a continuously smooth interior reflecting reflector surface 74. The reflector 70 is positioned intermediate the front face 28 of the housing 24 and the light sources 30a, 30b & 30c with the planar surface 72 positioned proximate and parallel to the front face 28 of the housing 24. In such arrangement, the reflector 70 is disposed to reflect the light fluxes emitted from the light sources 30a, 30b & 30c through the colored screens 40a, 40b & 40c and substantially in the direction 38 of the selected object in front of the illumination device 10.

The reflector 70 may alternatively comprise a semi-elliptical reflecting mirror disposed intermediate the light sources 30a, 30b and 30c and the front face 28 of the housing 24 so that its elliptical cross-sectional shape lies along a plane that is parallel to the front face 28 of the housing 24. In addition, although specific reflector shapes are disclosed, it will be obvious to those skilled in the art that many suitable replacements of varying sizes, shapes, forms, materials or construction are contemplated which do not depart from the spirit and scope of the present invention.

Figure 7:
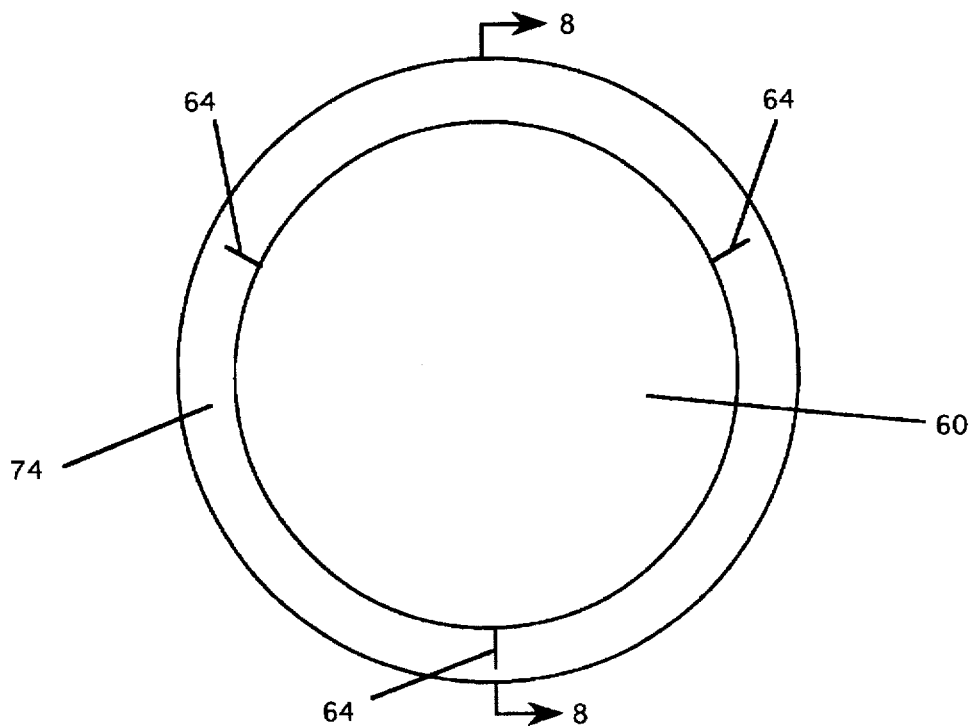
FIG. 7 is a front view of an alternative illumination device constructed according to the principles of the present invention illustrating a light mixer connected to the interior reflecting reflector surface by attachment means.

Another alternative embodiment, which is shown in FIGS. 7 & 8, includes a light mixer 60 which is a parabolic disc having a continuously smooth interior reflecting mixer surface 68 and a central axis coincident with the central axis of the reflector 70. The light mixer 60 is of the type readily available from a variety of commercial sources. The light mixer 60 is positioned intermediate the colored screens 40a, 40b & 40c and the selected object and disposed to mix the light fluxes projected from the light sources 30a, 30b & 30c and through the colored screens 40a, 40b & 40c, and to reflect a resulting light flux toward the reflector 70 where the resulting light flux is reflected toward the selected object in front of the illumination device 10. Attachment means 64 having first ends connected adjacent the periphery of the light mixer 60 and second ends connected to the interior reflecting reflector surface 74 fix the light mixer 60 within the reflector 70. The preferred attachment means 64 are helical springs, although wires or other known equivalents may be substituted.

The light sources 30a, 30b & 30c are arranged radially outward from the central axis of the light mixer 60 and the central axis of the reflector 70 and at substantially equal intervals defing a radius smaller than the radius of the light mixer 60.

Figure 9:
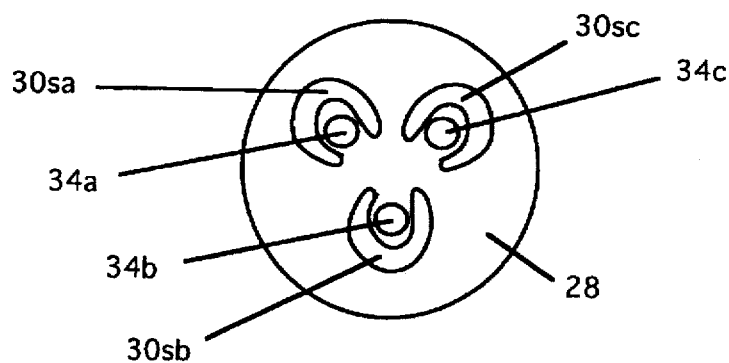
FIG. 9 is a front view of an alternative illumination device constructed according to the principles of the present invention illustrating colored strobe light sources and associated colored modelling light sources mounted on the front face of a housing.

In another alternative embodiment shown in FIG. 9, there is illustrated strobe light sources 30sa, 30sb & 30sc mounted on the front face 28 of a housing 24 and a modelling light source 34a, 34b & 34c associated with each of the strobe light sources 30sa, 30sb & 30sc and mounted on the front face 28 of the housing 24 proximate a respective strobe light source 30sa, 30sb & 30sc. The strobe light sources 30sa, 30sb & 30sc and the modelling light sources 34a, 34b & 34c are connected by leads 56a, 56b & 56c (not shown) to the power supply 20 and disposed to emit strobe light fluxes and modelling light fluxes substantially in the direction 38 of the selected object in front of the illumination device 10.

This alternative embodiment may also include a colored screen 40a, 40b & 40c associated with each of the strobe light sources 30sa, 30sb & 30sc and associated modelling light sources 34a, 34b & 34c and mounted intermediate the strobe light sources 30sa, 30sb & 30sc and modelling light sources 34a, 34b & 34c and the selected object in front of the illumination device 10. The colored screens 40a, 40b & 40c preferably each transmit only one of the three primary light colors; namely, red, blue, and green, inclusive. To clarify, colored screen 40a transmits only red light, colored screen 40b transmits only blue light, and colored screen 40c transmits only green light.

Figure 10:
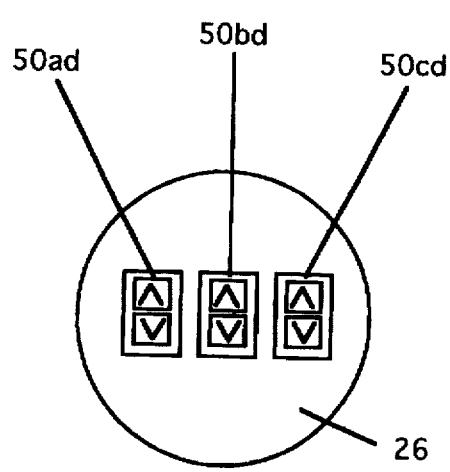
FIG. 10 is a back view of an alternative illumination device constructed according to the principles of the present invention illustrating means mounted on the back face of the housing for varying the strobe light fluxes and the modelling light fluxes, wherein the strobe light sources and associated modelling light sources are dependently linked.

Another alternative embodiment shown in FIG. 10 includes means 50ad, 50bd & 50cd which are dependently linked to the strobe light sources 30sa, 30sb & 30sc and their associated modelling light sources 34a, 34b and 34c to produce strobe light fluxes and associated modelling light fluxes of substantially equal luminosity and color saturation which can be varied in dependent fashion, so that the luminosity and color saturation of the modelling light fluxes projected toward an object can be used to pre-visualize the luminosity and color saturation of the strobe light fluxes which will be projected toward the object.

The alternative embodiment may further include the reflector 70 and light mixer 60 disclosed in connection with the preferred embodiment.

Figure 11:
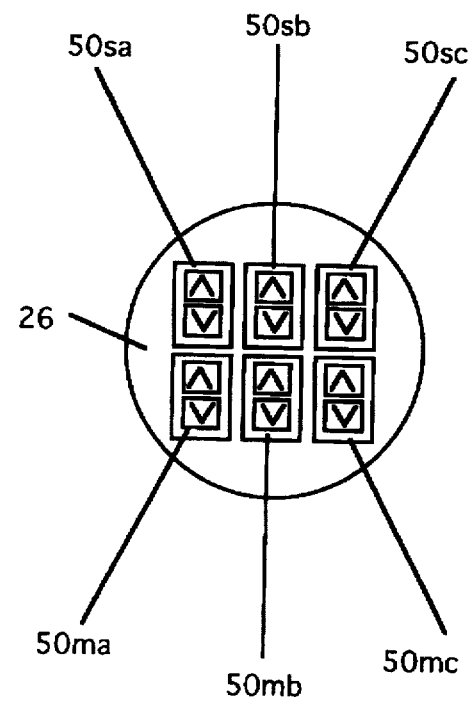
FIG. 11 is a back view of an alternative illumination device constructed according to the principles of the present invention illustrating means mounted on the back face of the housing for varying the strobe light fluxes and the modelling light fluxes, wherein each of the strobe light sources and modelling light sources have independent means associated therewith.

Another alternative embodiment, as shown in FIG. 11, includes means 50sa, 50sb & 50sc for independently and selectively varying the strobe light fluxes emitted from the strobe light sources 30sa, 30sb & 30sc and means 50ma, 50mb & 50mc for independently and selectively varying the modelling light fluxes emitted from the modelling light sources 34a, 34b and 34c, so that the luminosity and color saturation of the strobe light fluxes and modelling light fluxes projected toward the object can be varied. The means 50sa, 50sb, 50sc, 50ma, 50mb & 50mc generally comprise adjustable potentiometers with continuously variable output. The means 50sa, 50sb, 50sc, 50ma, 50mb & 50mc are connected to the power supply 20 by leads 52sa, 52sb, 52sc, 52ma, 52mb & 52mc (not shown) and connected to the strobe light sources 30sa, 30sb & 30sc and to the modelling light sources 34a, 34b & 34c by leads 58sa, 58sb, 58sc, 58ma, 58mb & 58mc (not shown). The means 50sa, 50sb, 50sc, 50ma, 50mb & 50mc are calibrated so that selected settings of the means 50sa, 50sb & 50sc connected to the strobe light sources 30sa, 30sb & 30sc project strobe light fluxes of substantially equal luminosity and color saturation to the modelling light fluxes projected for corresponding settings of the means 50ma, 50mb & 50mc connected to the modelling light sources 34a, 34b & 34c.

In operation of this embodiment, the illumination device 10 is disposed and the modelling light sources 34a, 34b and 34c activated so that the modelling light fluxes are transmitted generally in the direction 38 of the selected object. The means 50ma, 50mb & 50mc connected to the modelling light sources 34a, 34b & 34c are independently and selectively adjusted to project the desired luminosity and color saturation at the object. Once the desired luminosity and color saturation of the modelling light fluxes is achieved, the means 50sa, 50sb & 50sc connected to the strobe light sources 30sa, 30sb & 30sc are independently and selectively adjusted to correspond to their associated modelling light source settings.

As an alternative to colored screens 40a, 40b and 40c, colored strobe light sources 30sa, 30sb & 30sc, each emitting only one of the three primary light colors; namely, red, blue, and green, inclusive, and colored modelling light sources 34a, 34b and 34c, each emitting only one of the three primary light colors; namely, red, blue, and green, inclusive, can be substituted.

It will readily be understood by those skilled in the art that a variety of reflectors and light mixers can be used in connection with the alternative embodiments to mix and reflect the light toward the selected object.

Likewise, while the invention has been described in connection with a preferred embodiment and several alternative embodiments, it will be understood that it is not intended that the invention be limited to those embodiment. On the contrary, it is intended to cover all alternatives, modifications and equivalents as may be included within the spirit and scope of the invention as defined by the appended claims.

In view of the above, it will be seen that the several objects of this invention are achieved and other advantageous results are obtained.

As to the manner of usage and operation of the instant invention, same should be apparent from the above disclosure, and accordingly no further discussion relevant to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered illustrative of only the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An illumination device comprising,
a power supply contained in a housing having a front face;
a plurality of light sources mounted on said front face of said housing and connected to said power supply, said light sources being energized by said power supply and disposed to emit light fluxes substantially in the direction of a selected object in front of said illumination device;
a colored screen associated with each of said light sources and mounted intermediate said light sources and the selected object in front of said illumination device; and
means connected to said power supply and connected to said light sources for independently and selectively varying light fluxes emitted from said light sources, so that the luminosity and color saturation of the light fluxes projected toward the object can be varied.

2. The illumination device of claim 1 wherein said plurality of light sources includes at least three light sources and said colored screens include at least three colored screens, each of said colored screens transmitting only one of the primary light colors; namely, red, blue, and green, inclusive.

3. The illumination device of claim 2 wherein said plurality of light sources includes at least three light sources and said colored screens include at least three colored screens, each of said colored screens transmitting only one of the primary light colors; namely, red, blue, and green, inclusive.

4. An illumination device comprising, a power supply contained in a housing having a front face;

a plurality of strobe light sources mounted on said front face of said housing and a modelling light source associated with each of said strobe light sources and mounted on said front face of said housing proximate a respective strobe light source, said strobe light sources and said modelling light sources being connected to and energized by said power supply and disposed to emit strobe light fluxes and modelling light fluxes, respectively, substantially in the direction of a selected object in front of said illumination device;

a colored screen associated with each of said strobe light sources and said respective modelling light sources, said colored screens being mounted intermediate said strobe light sources and said modelling light sources and the selected object in front of said illumination device; and means connected to said power supply and connected to said strobe light sources and said modelling light sources for independently and selectively varying the strobe light fluxes and the modelling light fluxes emitted from said strobe light sources and said modelling light sources, respectively, so that the luminosity and color saturation of the light fluxes projected toward the object can be varied.

5. The illumination device of claim 4 wherein said plurality of strobe light sources includes at least three strobe light sources, said plurality of modelling light sources includes at least three modelling light sources, and said colored screens include at least three colored screens, each of said colored screens transmitting only one of the primary light colors; namely, red, blue, and green, inclusive.

6. The illumination device of claim 4 wherein said means connected to said power supply and connected to said strobe light sources and said modelling light sources for independently and selectively varying the strobe light fluxes and modelling light fluxes emitted from said strobe light sources and said modelling light sources, respectively, includes a plurality of links, each of said links being connected to one of said strobe light sources and a respective modelling light source, so that the luminosity and color saturation of one of the strobe light fluxes and the luminosity and color saturation of a respective modelling light flux dependently communicate.

7. The illumination device of claim 6 wherein said plurality of strobe light sources includes at least three strobe light sources, said plurality of modelling light sources includes at least three modelling light sources, and said colored screens include at least three colored screens, each of said colored screens transmitting only one of the primary light colors; namely, red, blue, and green, inclusive.

8. An illumination device comprising, a power supply contained in a housing having a front face;

a plurality of colored light sources mounted on said front face of said housing, said colored light sources emitting colored light fluxes, said colored light sources being connected to and energized by said power supply and disposed to emit said colored light fluxes substantially in the direction of a selected object in front of said illumination device; and means connected to said power supply for independently and selectively varying the output of each of said light sources, so that the luminosity and color saturation of said colored light fluxes projected toward the object can be varied.

9. The illumination device of claim 8 wherein said plurality of colored light sources includes at least three light bulbs or lamps, each of said light bulbs or lamps emitting only one of the primary light colors; namely, red, blue, and green, inclusive.

10. The illumination device of claim 8 wherein said plurality of colored light sources includes at least three light bulbs or lamps, each of said light bulbs or lamps emitting only one of the primary light colors; namely, red, blue, and green, inclusive.

11. An illumination device comprising, a power supply contained in a housing having a front face;

a plurality of strobe light sources mounted on said front face of said housing and a modelling light source associated with each of said strobe light sources and mounted on said front face of said housing proximate a respective strobe light source, said strobe light sources and said modelling light sources being connected to and energized by said power supply and disposed to emit strobe light fluxes and modelling light fluxes, respectively, substantially in the direction of a selected object in front of said illumination device;

a colored screen associated with each of said strobe light sources and said respective modelling light sources, said colored screens being mounted intermediate said strobe light sources and said modelling light sources and the selected object in front of said illumination device; and means connected to said power supply and connected to said strobe light sources and said modelling light sources for independently and selectively varying the strobe light fluxes and the modelling light fluxes emitted from said strobe light sources and said modelling light sources, respectively, so that the luminosity and color saturation of the light fluxes projected toward the object can be varied.

12. The illumination device of claim 11 wherein said plurality of strobe light sources includes at least three light bulbs or lamps, each of said light bulbs or lamps emitting only one of the primary light colors; namely, red, blue, and green, inclusive, and said modelling light sources include at least three light bulbs or lamps, each of said light bulbs or lamps emitting only one of the primary light colors; namely, red, blue, and green, inclusive.

13. The illumination device of claim 11 wherein said means connected to said power supply and connected to said strobe light sources and said modelling light sources for independently and selectively varying the strobe light fluxes and modelling light fluxes emitted from said strobe light sources and said modelling light sources, respectively, includes a plurality of links, each of said links being connected to one of said strobe light sources and a respective modelling light source, so that the luminosity and color saturation of one of the strobe light fluxes and the luminosity and color saturation of a respective modelling light flux dependently communicate.

14. The illumination device of claim 13 wherein said plurality of strobe light sources includes at least three light bulbs or lamps, each of said light bulbs or lamps emitting only one of the primary light colors; namely, red, blue, and green, inclusive, and said modelling light sources include at least three light bulbs or lamps, each of said light bulbs or lamps emitting only one of the primary light colors; namely, red, blue, and green, inclusive.

* * * * *